United States Patent
Hidaka et al.

(10) Patent No.: US 11,861,638 B2
(45) Date of Patent: Jan. 2, 2024

(54) SERVER APPARATUS

(71) Applicant: HONDA MOTOR CO., LTD., Tokyo (JP)

(72) Inventors: Yuichi Hidaka, Saitama (JP); Yutaka Fukai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 17/669,786

(22) Filed: Feb. 11, 2022

(65) Prior Publication Data

US 2022/0261829 A1    Aug. 18, 2022

(30) Foreign Application Priority Data

Feb. 15, 2021 (JP) ................................ 2021-022124

(51) Int. Cl.
*G06Q 30/0201* (2023.01)
*G07C 9/00* (2020.01)

(52) U.S. Cl.
CPC ..... *G06Q 30/0206* (2013.01); *G07C 9/00309* (2013.01); *G07C 2009/00587* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 10,026,068 B2* | 7/2018 | Kanayama | G06Q 20/145 |
| 2021/0192645 A1 | 6/2021 | Kawamura et al. | |
| 2022/0261829 A1* | 8/2022 | Hidaka | G07C 9/00309 |
| 2023/0021252 A1* | 1/2023 | Scaringe | H02J 7/14 |
| 2023/0124067 A1* | 4/2023 | Maeng | G06Q 30/0283 |
| | | | 705/34 |

FOREIGN PATENT DOCUMENTS

WO    WO 2020/027196 A1    2/2020

* cited by examiner

*Primary Examiner* — Carlos Garcia
(74) *Attorney, Agent, or Firm* — Paratus Law Group, PLLC (57) ABSTRACT

A server apparatus includes a processor configured to manage identification information of a registered vehicle registered in advance, acquire identification information on a vehicle of a user who wants to replace the batteries from a vehicle key device, acquire fee-related information from the vehicle key device, the fee-rerated information being at least one of a travel distance and a battery usage amount of the vehicle of the user, calculate a usage fee of the batteries based on the fee-related information, determine permission and prohibition to replace a battery, control a lock device which enables taking-out of the batteries accommodated in the battery stand, determine the permission and prohibition to replace the batteries based on the identification information acquired from the vehicle key device and the identification information, and unlock the lock device when it is determined to permit replacing the batteries.

16 Claims, 9 Drawing Sheets

SERVER APPARATUS

CROSS-REFERENCE TO RELATED APPLICATIONS

This application is based on and claims priority under 35 USC 119 from Japanese Patent Application No. 2021-022124 filed on Feb. 15, 2021.

TECHNICAL FIELD

The present disclosure relates to a server apparatus used for a battery sharing service.

BACKGROUND ART

There is a sharing service that a battery which is a drive source of a moving object such as an electric vehicle is detachable and is jointly used by a plurality of users. In this service, a mechanism in which battery stands for holding and charging a plurality of detachable batteries are installed, and the users are billed for using the battery stands is constructed.

For example, WO-A-2020/027196 discloses that a battery stand acquires battery usage state information from a detachable battery inserted into a slot portion and transmits the battery usage state information to a management server, and the management server performs billing in accordance with a detachable battery usage situation of a user.

SUMMARY

However, in a method disclosed in WO-A-2020/027196, the battery is required to store the battery usage state information, and a battery in which the battery usage state information is not stored cannot be used. In order to develop the battery sharing service, it is necessary to promote usage of many batteries having different specifications.

In recent years, communication with a server apparatus which provides various services using a mobile terminal device such as a smartphone has been performed on a daily basis. However, when a battery of the mobile terminal device is low, the services may not be received.

The present disclosure provides a server apparatus capable of appropriately performing battery management and fee billing in a battery sharing service without using a mobile terminal device and regardless of stored information of a battery.

According to an aspect of the present disclosure, there is provided a server apparatus of a battery stand holding a plurality of batteries to be detachably attached to a vehicle movable using electric power, the server apparatus including:

a processor configured to:
manage identification information of a registered vehicle registered in advance;
acquire identification information on a vehicle of a user who wants to replace the batteries from a vehicle key device;
acquire fee-related information from the vehicle key device, the fee-rerated information being at least one of a travel distance and a battery usage amount of the vehicle of the user;
calculate a usage fee of the batteries based on the fee-related information;
determine permission and prohibition to replace a battery;
control a lock device which enables taking-out of the batteries accommodated in the battery stand;
determine the permission and prohibition to replace the batteries based on the identification information acquired from the vehicle key device and the identification information; and
unlock the lock device when it is determined to permit replacing the batteries.

According to the present disclosure, battery management and fee billing can be appropriately performed without using a mobile terminal device and regardless of stored information of a battery.

DESCRIPTION OF EMBODIMENTS

Hereinafter, an embodiment of the present disclosure will be described with reference to FIGS. 1 to 7.

[Battery Sharing System]

Figure 1:
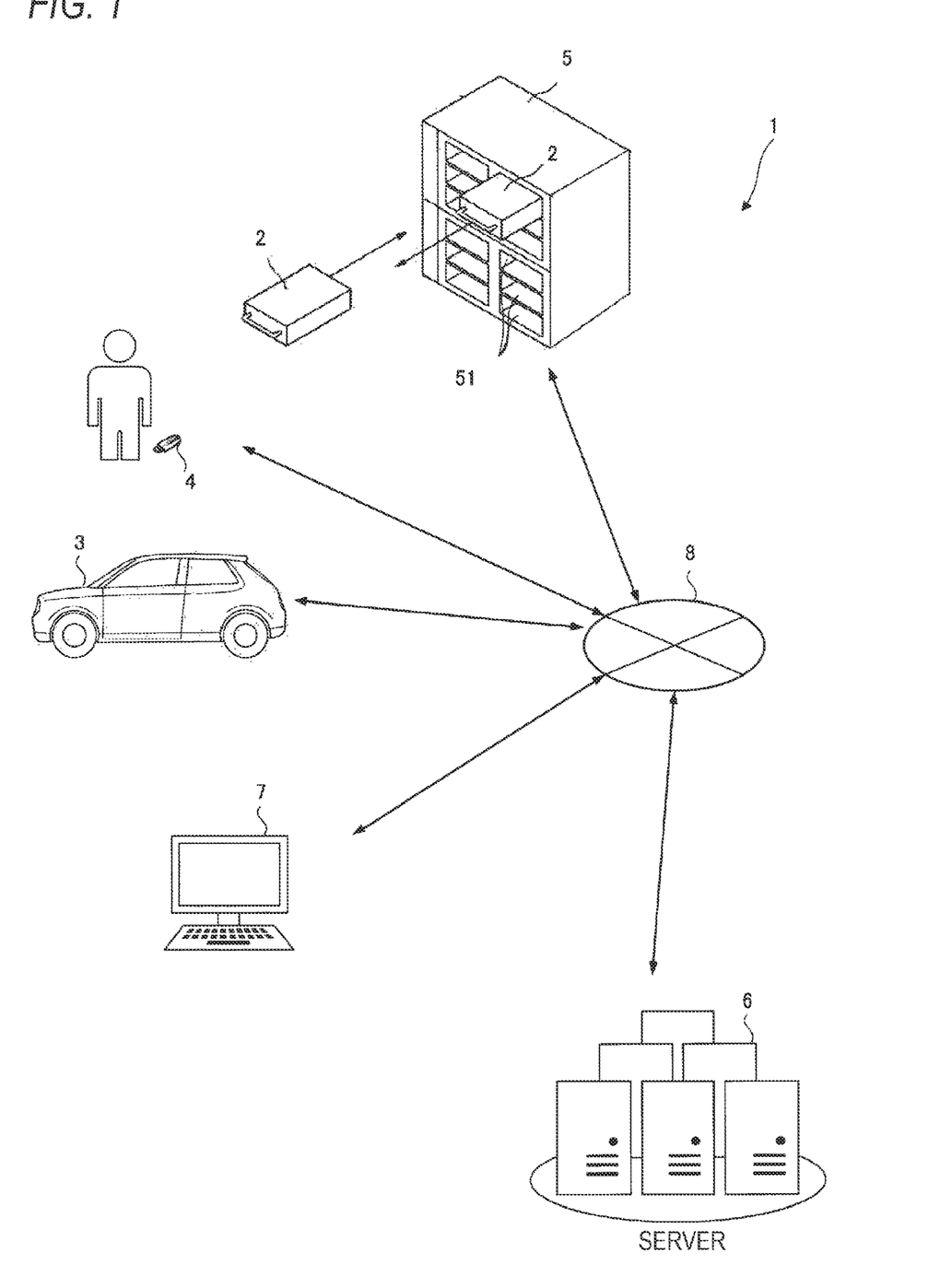
FIG. 1 is a diagram illustrating an overall configuration of a battery sharing system 1.

As illustrated in FIG. 1, a battery sharing system 1 includes a vehicle 3 which moves using electric power of detachable batteries 2, a vehicle key device 4 which manages locking or the like of the vehicle 3, a battery stand 5 which holds a plurality of batteries 2, a server apparatus 6 which manages replacement of the batteries 2 in the battery stand 5, a dealer terminal 7 used by a dealer who performs maintenance or the like of the vehicle 3, and a network 8 which communicably connects the vehicle 3, the vehicle key device 4, the battery stand 5, the server apparatus 6, and the dealer terminal 7.

[Network]

The network 8 enables the mutual communication between the vehicle 3, the vehicle key device 4, the battery stand 5, the server apparatus 6, and the dealer terminal 7 by one communication line or a combination of a plurality of communication lines among communication lines such as short-range wireless communication, a wireless LAN, a mobile phone communication network, and the Internet.

[Vehicle Key Device]

Figure 2:
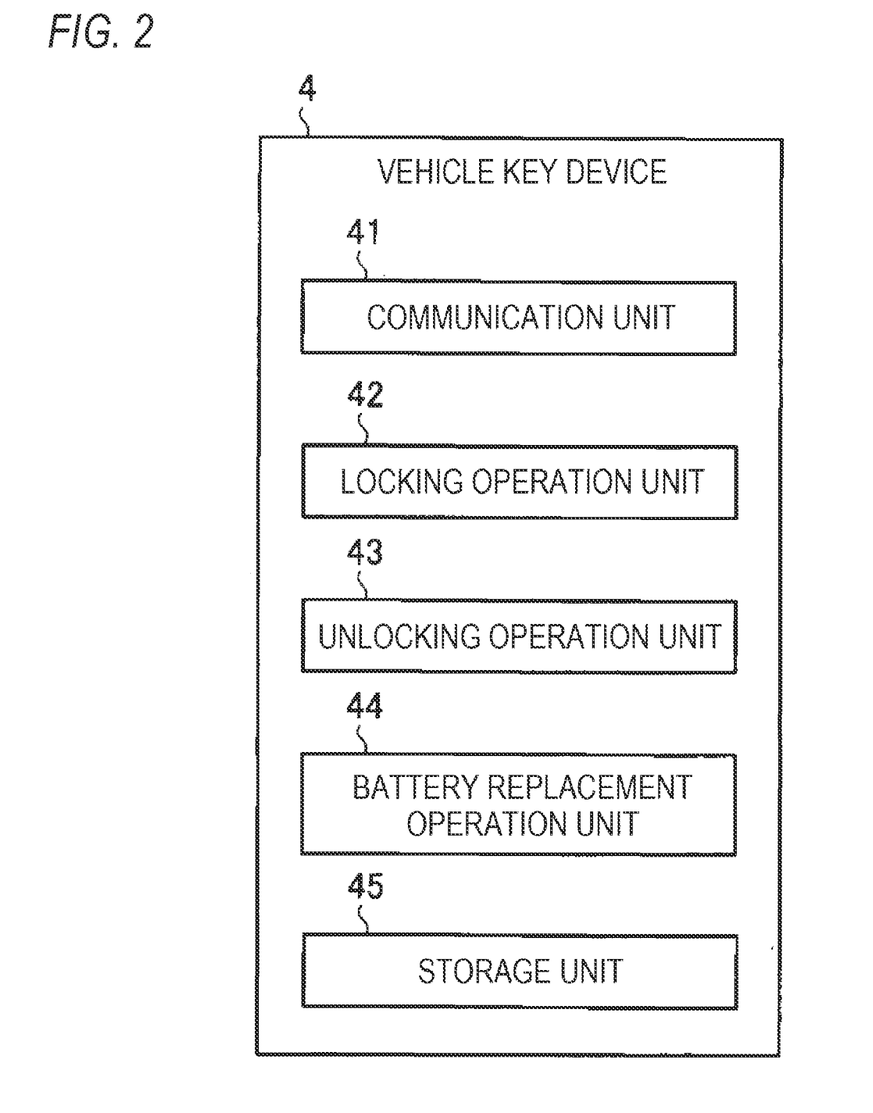
FIG. 2 is a diagram illustrating a configuration of a vehicle key device 4.

The vehicle key device 4 is a dedicated key device attached to the vehicle 3. As illustrated in FIG. 2, the vehicle key device 4 includes a communication unit 41 which can be connected to the network 8, a locking operation unit 42 which performs a locking operation on the vehicle 3, an unlocking operation unit 43 which performs an unlocking operation on the vehicle 3, a battery replacement operation unit 44 which is operated at a time of battery replacement, and a storage unit 45 which stores identification information (a key number) of the vehicle 3, fee-related information (a travel distance and a battery usage amount) on a battery replacement fee, and the like.

[Vehicle]

Figure 3:
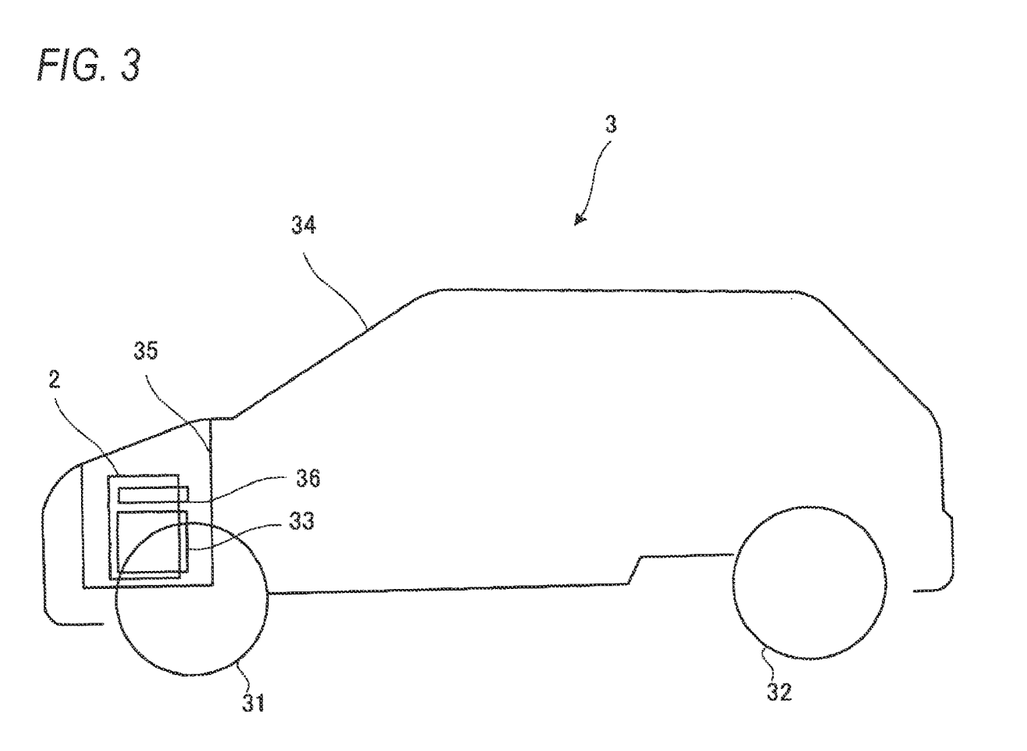
FIG. 3 is a side view illustrating an example of a vehicle 3.
Figure 4:
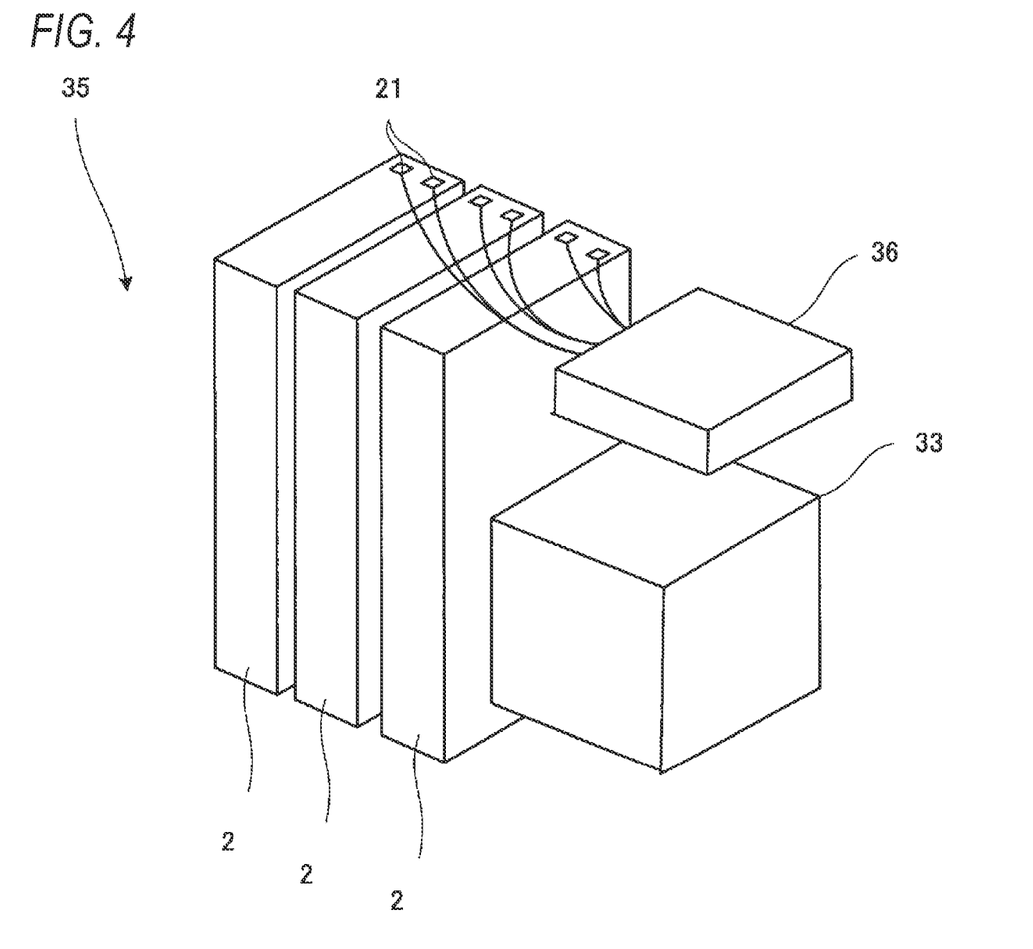
FIG. 4 is a perspective view illustrating an example of a battery 2 and the like mounted on the vehicle 3.

The vehicle 3 is an automobile including a drive source and wheels including drive wheels driven by power of the drive source and steerable steering wheels. As illustrated in FIGS. 3 and 4, the vehicle 3 according to the present embodiment is a four-wheeled automobile including a pair of left and right front wheels 31 and a pair of left and right rear wheels 32, and the drive source of the vehicle 3 is, for example, an electric motor 33.

The vehicle 3 includes, for example, a frame member (not illustrated) having a monocoque structure formed by welding and assembling a steel plate panel, and an outer shell member 34 which covers the frame member and forms an outer shell of the vehicle 3. In a space surrounded by the outer shell member 34, a vehicle cabin (not illustrated) accommodating an occupant and a motor room 35 formed in front of the vehicle cabin are provided.

The motor room 35 accommodates the electric motor 33, the plurality of batteries 2, a lock mechanism (not illustrated), and a control unit 36.

Each of the batteries 2 is a rechargeable secondary battery, and is configured to be replaceable by a user. The batteries 2 are substantially rectangular parallelepiped, and arranged side by side in a vehicle width direction (left-right direction) of the vehicle 3 such that side surfaces thereof face each other. Accordingly, the batteries 2 can be easily replaced by the user by being individually pulled upward.

The lock mechanism is a mechanism which locks attachment and detachment of the batteries 2, and for example, unlocks the batteries 2 in response to a short-time operation of the battery replacement operation unit 44 provided in the vehicle key device 4, thereby allowing the attachment and detachment of the batteries 2.

Each of the batteries 2 includes a pair of positive and negative electrode pads 21 connected to the control unit 36, and inputs and outputs electric power via the electrode pads 21. The control unit 36 includes: a power control unit including an inverter which drives the electric motor 33, a boost converter which controls a voltage, and the like; a battery control unit which controls charging of the batteries 2; and a communication unit which can be connected to the network 8. The battery control unit can acquire a usage amount (SOC) of each of the batteries 2 and the travel distance of the vehicle 3 as the fee-related information, and store the acquired fee-related information in the storage unit 45 of the vehicle key device 4 via an in-vehicle network or the like. For example, when the vehicle 3 is stopped and the occupant pulls out the vehicle key device 4, the fee-related information is stored in the storage unit 45 of the vehicle key device 4.

[Battery Stand]

As illustrated in FIG. 1, the battery stand 5 includes a plurality of battery accommodating portions 51 which detachably accommodate the batteries 2. After user authentication, the user who performs the battery replacement takes out the charged battery 2 from the battery accommodating portion 51 and accommodates the used battery 2 in the battery accommodating portion 51.

Figure 5:
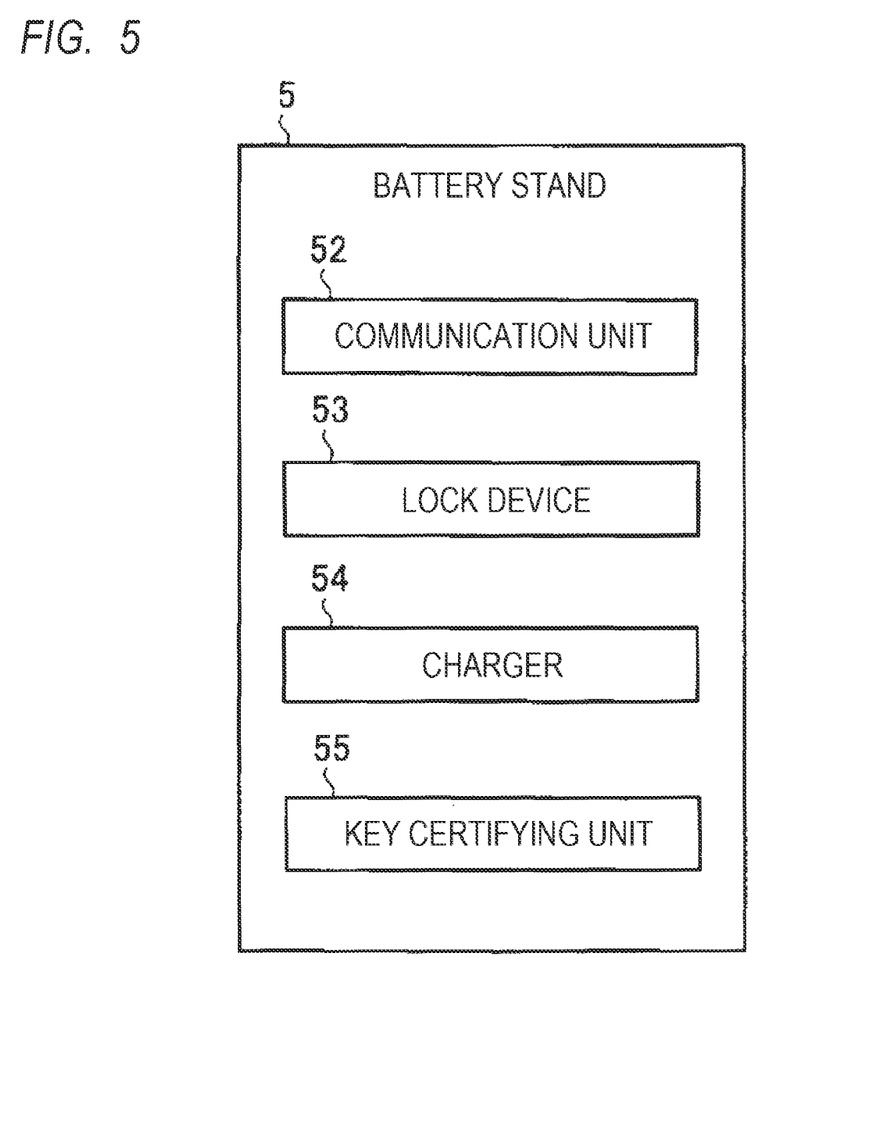
FIG. 5 is a diagram illustrating a configuration of a battery stand 5.

As illustrated in FIG. 5, inside the battery stand 5, a communication unit 52 which can be connected to the network 8, a plurality of lock devices 53 which lock the attachment and detachment of the batteries 2 in the battery accommodating portions 51, chargers 54 which charge the batteries 2 attached to the battery accommodating portions 51, and a key certifying unit 55 which certifies the vehicle key device 4 are provided. Each of the units of the battery stand 5 is managed by the server apparatus 6, and operates in accordance with a control command from the server apparatus 6.

[Server Apparatus]

The server apparatus 6 is configured as a server of a company which performs a paid battery replacement service via a plurality of battery stands 5, and includes, as hardware, a communication unit which can be connected to the network 8, a calculation unit such as a CPU, a storage unit such as an ROM and an RAM, and other peripheral circuits. The server apparatus 6 may be a distributed server including a plurality of server apparatuses or a distributed virtual server (cloud server) created in a cloud environment. The paid battery replacement service includes a usage-based system in which a fee is charged in accordance with the travel distance or the battery usage amount, and a fixed-price system (hereinafter, may be referred to as a subscription service as appropriate) in which a service is provided at a fixed price when the travel distance or the battery usage amount is within a contract range.

Figure 6:
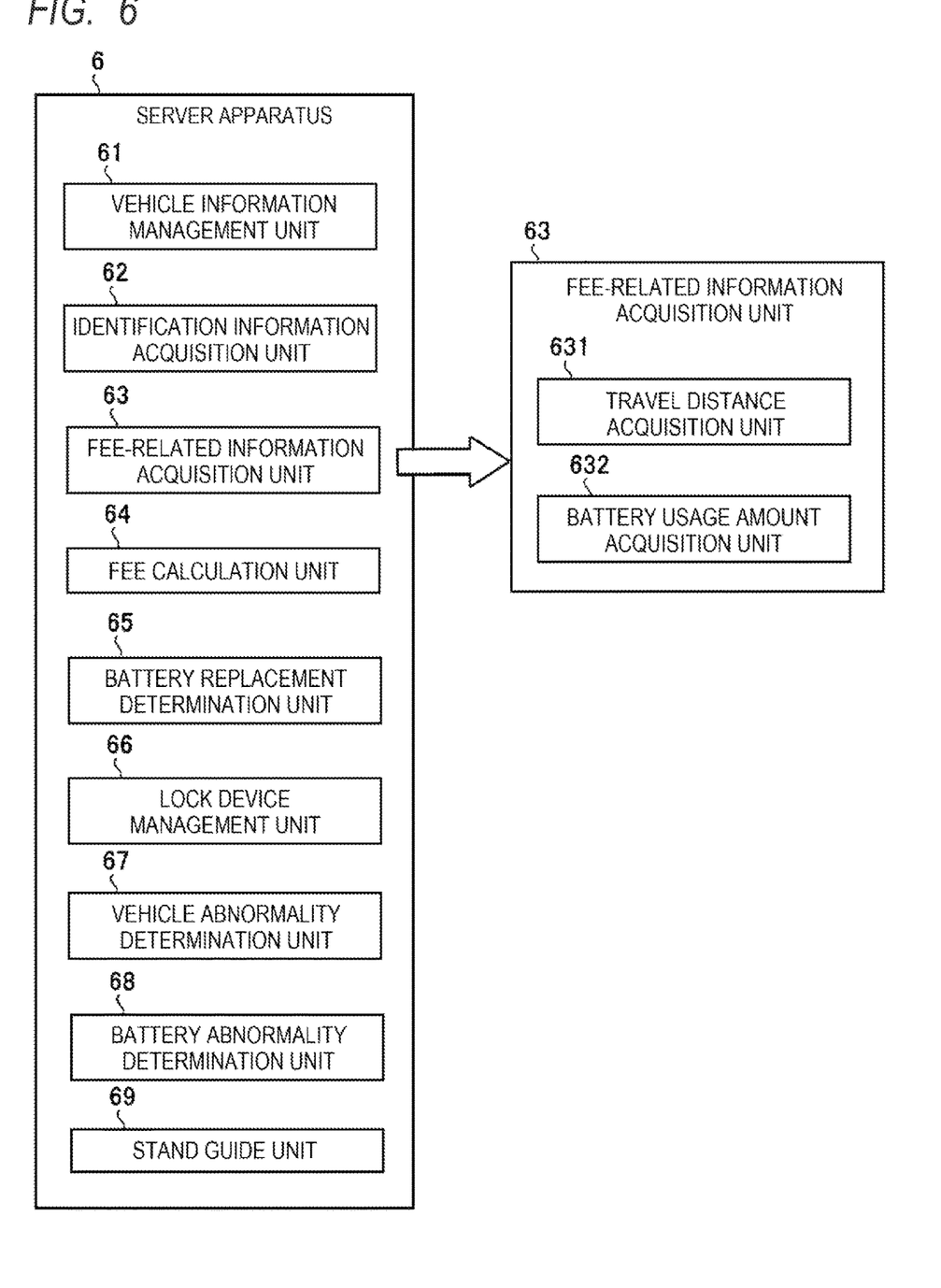
FIG. 6 is a diagram illustrating a configuration of a server apparatus 6.

As illustrated in FIG. 6, as functional components implemented by cooperation of the hardware and software, the server apparatus 6 includes a vehicle information management unit 61, an identification information acquisition unit 62, a fee-related information acquisition unit 63, a fee calculation unit 64, a battery replacement determination unit 65, a lock device management unit 66, a vehicle abnormality determination unit 67, a battery abnormality determination unit 68, and a stand guide unit 69.

The vehicle information management unit 61 manages the identification information (such as the key number) of the vehicle 3 (hereinafter, referred to as a registered vehicle 3) registered in advance. Further, the vehicle information management unit 61 stores, in association with the identification information, a contract content, settlement information, the number of batteries 2 mounted on the registered vehicle 3, fee-related information at a time of previous battery replacement, and the like.

The identification information acquisition unit 62 acquires, from the vehicle key device 4, the identification information on the vehicle 3 of the user who wants to replace the batteries 2. For example, when the user performs a long press operation on the battery replacement operation unit 44 of the vehicle key device 4 in the vicinity of the battery stand 5, communication between the server apparatus 6 and the vehicle key device 4 is started via the key certifying unit 55 of the battery stand 5, and the identification information stored in the vehicle key device 4 is transmitted to the server apparatus 6.

The fee-related information acquisition unit 63 acquires the fee-related information which is at least one of the travel distance and the battery usage amount of the vehicle 3 of the user. The fee-related information acquisition unit 63 according to the present embodiment includes a travel distance acquisition unit 631 which acquires the travel distance from the vehicle key device 4, and a battery usage amount acquisition unit 632 which acquires the battery usage amount from the vehicle key device 4.

The fee calculation unit 64 calculates a usage fee of the batteries 2 based on the fee-related information. Specifically, the usage fee is calculated based on the travel distance and/or the battery usage amount which are acquired from the vehicle key device 4. Further, when the registered vehicle 3 is the vehicle 3 of the user of the subscription service, the fee calculation unit 64 charges the usage fee only when the travel distance or the battery usage amount exceeds the contract range.

For example, the fee calculation unit 64 calculates the travel distance or the battery usage amount of the battery 2 to be replaced this time by subtracting the fee-related information at the time of the previous battery replacement acquired from the vehicle information management unit 61 from the fee-related information at a time of current battery replacement acquired from the vehicle key device 4, and calculates the usage fee based on the travel distance or the battery usage amount. When a contract of the user is the usage-based system, the user is charged with the calculated usage fee. In a case where the contract of the user is the subscription service, when the calculated travel distance or the calculated battery usage amount exceeds the contract range, a part or all of the calculated usage fee is charged to the user as an additional fee.

The battery replacement determination unit 65 determines permission and prohibition of the replacement of the batteries 2. For example, the battery replacement determination unit 65 determines the permission and prohibition of the replacement of the batteries 2 based on the identification information acquired from the vehicle key device 4 and the identification information registered in the vehicle information management unit 61.

The lock device management unit 66 controls the lock devices 53 which enable taking-out of the batteries 2 accommodated in the battery stand 5. The lock device management unit 66 releases the lock devices 53 when the battery replacement determination unit 65 permits the replacement of the batteries 2. At this time, the lock device management unit 66 releases the same number of lock devices 53 based on the number of batteries 2 of the registered vehicles 3 stored in the vehicle information management unit 61.

Further, when the user designates the battery stand 5 to be used according to guidance of the stand guide unit 69, the lock device management unit 66 performs reservation processing for prohibiting unlocking of the lock device 53 of the battery 2 to be replaced by another user. Thereafter, when the identification information is acquired from the vehicle key device 4 of the reserved user, the lock device management unit 66 unlocks the lock device 53 on which the reservation processing is performed.

The vehicle abnormality determination unit 67 calculates an electric power consumption rate (hereinafter, may be referred to as "electric power consumption" as appropriate) based on the travel distance and the battery usage amount acquired from the vehicle key device 4 (or a remaining battery level of the used battery 2 acquired from the battery stand 5), and determines an abnormality of the vehicle 3 when the electric power consumption rate exceeds a first threshold. When the vehicle abnormality determination unit 67 determines the abnormality of the vehicle 3, the vehicle abnormality determination unit 67 notifies the vehicle 3, the vehicle key device 4, and the dealer terminal 7 of the abnormality. The first threshold is set based on information stored in the storage unit. The information stored in the storage unit is, for example, information based on a correlation between the travel distance of the registered vehicle 3 and the battery usage amount of the registered vehicle 3 of a plurality of service users. By setting the threshold according to actual use states, detection accuracy of the vehicle abnormality can be improved.

The battery abnormality determination unit 68 determines an abnormality of the battery 2 based on a charging amount of the battery 2 at a time of charging the returned battery 2. The lock device 53 of the battery accommodating portion 51 in which the battery 2 determined to be abnormal is accommodated is prohibited from being unlocked.

The stand guide unit 69 communicates with the vehicle 3 and guides the vehicle 3 to the battery stand 5. The guidance may be performed by a navigation device provided in the vehicle 3 or by a mobile terminal carried by the user of the vehicle 3. The stand guide unit 69 notifies the vehicle 3 or the user of the battery stand 5 which holds the replaceable battery 2 among the plurality of battery stands 5, and receives reservation of the battery 2.

[Battery Replacement Processing Procedure]

Figure 7:
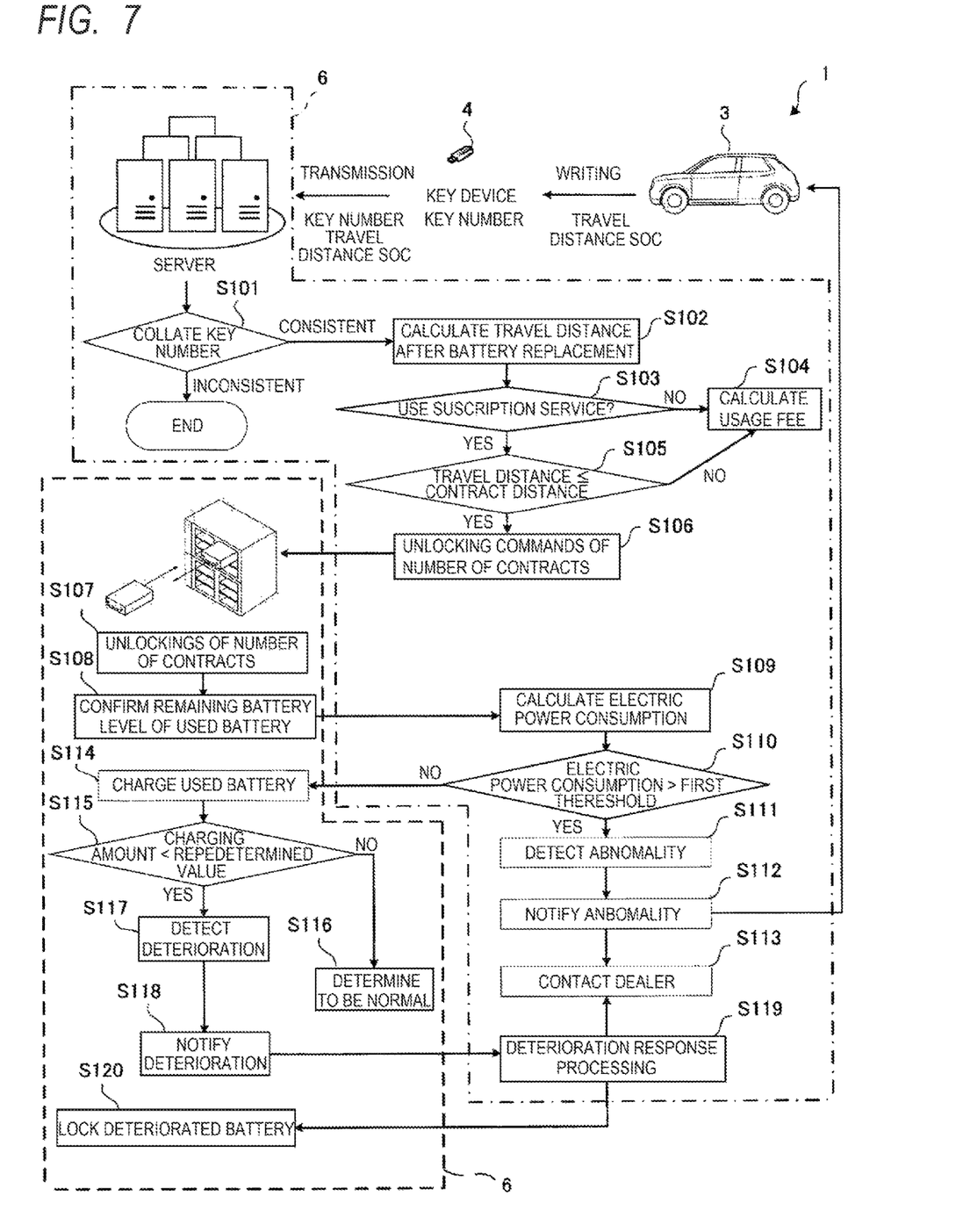
FIG. 7 is a flowchart of battery replacement processing performed by the battery sharing system 1.

Next, a processing procedure of battery replacement processing performed by the battery sharing system 1 will be described with reference to FIG. 7.

The user who wants to replace the batteries drives the vehicle 3 to the battery stand 5. When power of the battery 2 is completely used up during parking at home, or when the power of the battery 2 is completely used up in a middle of driving to the battery stand 5, the user detaches the battery 2 from the vehicle 3 and goes to the battery stand 5 while holding the battery 2 and the vehicle key device 4.

When the user arrives at the battery stand 5, the user performs the long press operation on the battery replacement operation unit 44 of the vehicle key device 4. When the server apparatus 6 receives an operation signal from the vehicle key device 4 via the key certifying unit 55 of the battery stand 5, the server apparatus 6 receives the identification information and the fee-related information which are stored in the vehicle key device 4, performs collation of the key number as the user authentication (S101), and ends the battery replacement processing when a result of the collation is inconsistent.

When the key number is consistent, the server apparatus 6 calculates a travel distance after the previous battery replacement (S102), and determines whether the user is using the subscription service (S103). When a determination result of the determination is NO, the server apparatus 6 calculates the usage fee in accordance with the travel distance or the battery usage amount (S104: fee calculation based on the usage-based system). When the server apparatus 6 determines that the user is using the subscription service, the server apparatus 6 determines whether the travel distance is equal to or less than a contract distance (S105). When a determination result of the determination is NO, the server apparatus 6 calculates the additional fee in accordance with the travel distance or the battery usage amount (S104: additional fee calculation based on the fixed-price system). When the server apparatus 6 determines that the user uses the subscription service and the travel distance is equal to or less than the contract distance, the server apparatus 6 transmits an unlocking command to the battery stand 5 so as to release the lock devices 53 corresponding to the number of contracted batteries (S106). In addition, when the usage fee calculated in S104 is paid, the unlocking command is transmitted in the same manner.

When the battery stand 5 receives the unlocking command from the server apparatus 6, the battery stand 5 unlocks the lock devices 53 corresponding to the number of the contracted batteries (S107), and when the battery 2 is replaced, the battery stand 5 acquires a remaining battery level of the used battery 2 and transmits the remaining battery level to the server apparatus 6 (S108).

When the server apparatus 6 receives the remaining battery level of the used battery 2 from the battery stand 5, the server apparatus 6 calculates the electric power consumption based on the remaining battery level and the travel distance (S109), and determines whether the calculated electric power consumption exceeds the first threshold (S110). When a determination result of the determination is YES, the server apparatus 6 determines that the vehicle 3 is abnormal (S111), and transmits an abnormality notification to the vehicle 3 or the dealer terminal 7 (S112 and S113).

When the server apparatus 6 determines that the electric power consumption does not exceed the first threshold, the server apparatus 6 transmits a charging command for the used battery 2 to the battery stand 5, and the battery stand 5 which receives the charging command charges the used battery 2 (S114). Thereafter, the battery stand 5 determines whether the charging amount of the charged battery 2 is less than a predetermined value (S115). When a determination result of the determination is NO, the battery stand 5 determines that the battery 2 is normal (S116) and holds the battery 2 as the charged battery 2 which can be rented. When the battery stand 5 determines that the charging amount of the charged battery 2 is less than the predetermined value, the battery stand 5 determines that the battery 2 is deteriorated (S117), and transmits a deterioration notification to the server apparatus 6 (S118). When the server apparatus 6 receives the deterioration notification from the battery stand 5, the server apparatus 6 transmits a lock command of the deteriorated battery 2 to the battery stand 5 and transmits deterioration information to the dealer terminal 7 as deterioration response processing (S119). When the battery stand 5 receives the lock command, the battery stand 5 prohibits the unlocking of the battery 2 (S120).

As described above, the identification information acquisition unit 62 acquires the identification information from the vehicle key device 4, and the fee-related information acquisition unit 63 acquires the fee-related information from the vehicle key device 4. Therefore, since the battery replacement can be performed without using a mobile terminal device such as a smartphone, the battery replacement can be performed if only the vehicle key device 4 necessary for driving the vehicle 3 is carried regardless of battery exhaustion of the mobile terminal device. Further, since the server apparatus 6 determines whether the vehicle is the registered vehicle based on the identification information acquired from the vehicle key device 4, and calculates the usage fee of the battery 2 based on the fee-related information acquired from the vehicle key device 4, the server apparatus 6 can appropriately perform battery management and fee billing regardless of stored information of the battery 2.

[Server Apparatus of Modification]

Next, the battery sharing system 1 and the server apparatus 6 according to a modification will be described with reference to FIGS. 8 and 9. Differences from the above-described embodiment will be described, and for configurations common to the above-described embodiment, the description of the above-described embodiment may be incorporated by using the same reference numerals as those of the above-described embodiment.

Figure 8:
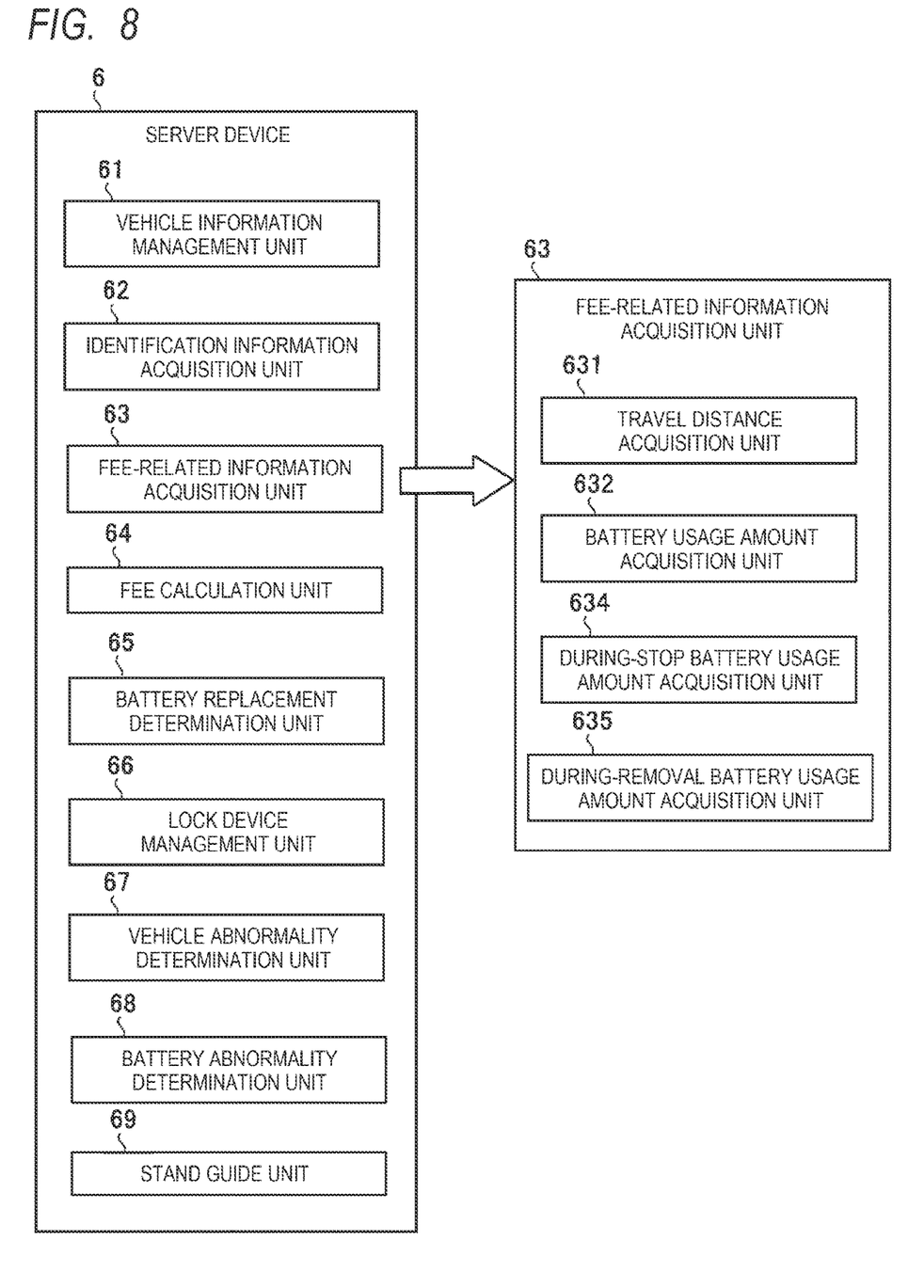
FIG. 8 is a diagram illustrating a configuration of the server apparatus 6 according to a modification.
Figure 9:
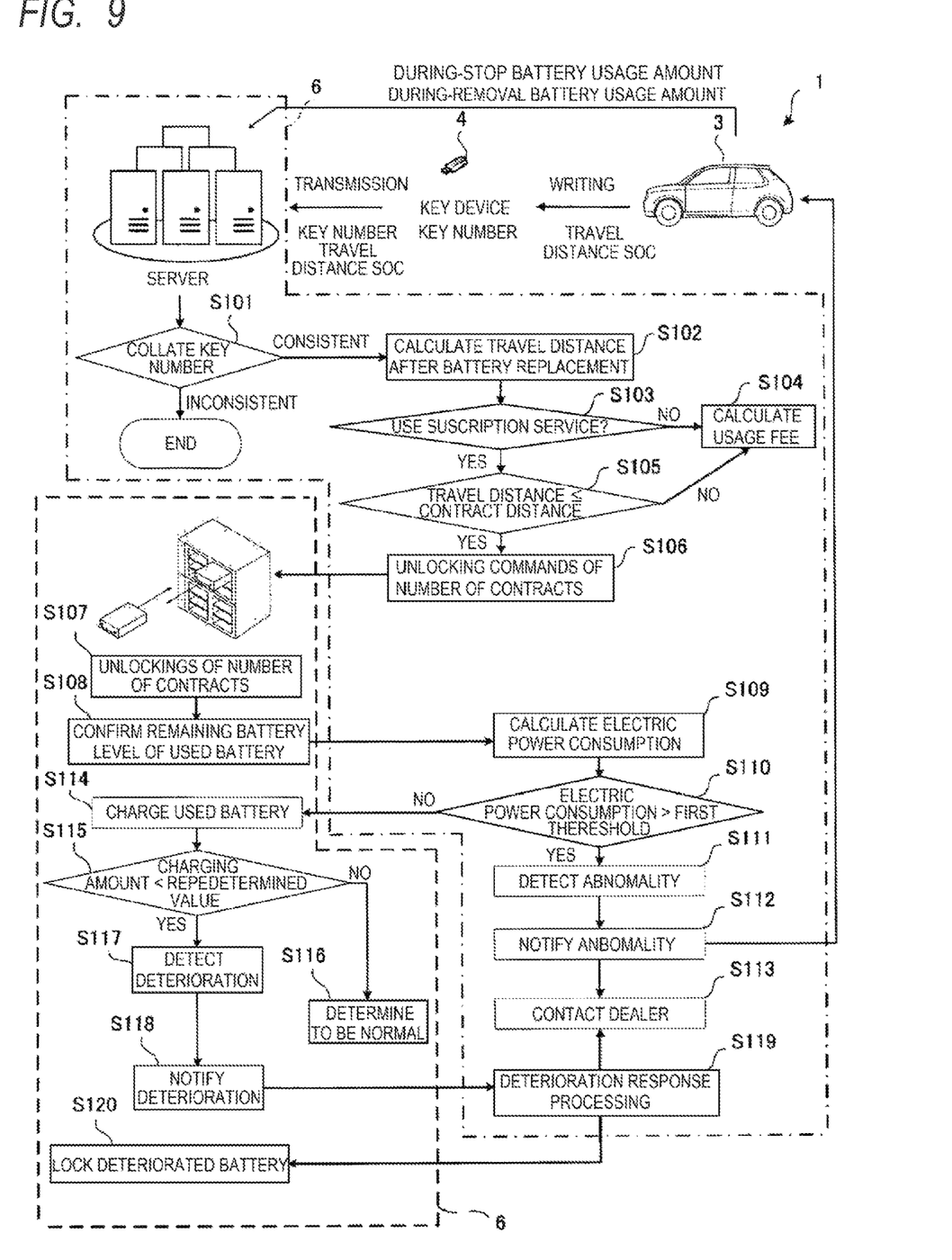
FIG. 9 is a flowchart of battery replacement processing performed by the battery sharing system 1 according to the modification.

As illustrated in FIGS. 8 and 9, the server apparatus 6 according to the modification is different from that according to the above-described embodiment in that the fee-related information acquisition unit 63 includes a during-stop battery usage amount acquisition unit 634 which communicates with the vehicle 3 and acquires a battery usage amount during stop of the vehicle 3, and a during-detachment battery usage amount acquisition unit 635 which acquires a battery usage amount during detachment of the battery 2 when the detachment of the battery 2 in the vehicle 3 is detected.

In addition, the server apparatus 6 according to the modification is different from that according to the above-described embodiment in that the fee calculation unit 64 adds a usage fee when the battery usage amount during the stop of the vehicle 3 exceeds a second threshold, and adds the usage fee when the battery usage amount during the detachment of the battery 2 exceeds a third threshold. According to such a modification, an appropriate usage fee can be calculated in consideration of the battery usage amount during the stop of the vehicle and the battery usage during the detachment.

Although the embodiments are described above with reference to the drawings, it is needless to say that the present invention is not limited to such examples. It is apparent to those skilled in the art that various changes and modifications can be conceived within the scope of the claims, and it is also understood that the various changes and modifications belong to the technical scope of the present invention. Components in the embodiments described above may be combined freely within a range not departing from the spirit of the invention.

The present specification describes at least the following matters. Although corresponding components or the like in the above embodiment are shown in parentheses, the present invention is not limited thereto.

(1) A server apparatus (server apparatus 6) of a battery stand (battery stand 5) holding a plurality of batteries (batteries 2) to be detachably attached to a vehicle (vehicle 3) movable using electric power, the server apparatus includes:

a processor configured to:
  manage identification information of a registered vehicle registered in advance;
  acquire identification information on a vehicle (vehicle 3) of a user who wants to replace the batteries from a vehicle key device (vehicle key device 4);
  acquire fee-related information from the key device, the fee-related information being at least one of a travel distance and a battery usage amount of the vehicle of the user;
  calculate a usage fee of the batteries based on the fee-related information;
  determine permission and prohibition to replace a battery;
  control a lock device (lock devices 53) which enable taking-out of the batteries accommodated in the battery stand;
  determine the permission and prohibition to replace the batteries based on the identification information acquired from the vehicle key device and the identification information; and
  unlock the lock device when it is determined to permit replacing the batteries.

According to (1), since the processor determines whether the vehicle is the registered vehicle based on the identification information acquired from the vehicle key device, and calculates the usage fee of the battery based on the fee-related information acquired from the vehicle key device, the server apparatus can appropriately perform battery management and fee billing regardless of stored information of the battery. Meanwhile, the user who uses the battery sharing service provided by the server apparatus does not need to pay for the batteries when purchasing the vehicle, and a purchase cost of the vehicle can be kept low.

Further, since the identification information and the fee-related information are stored in the vehicle key device, the user can replace the batteries without the mobile terminal device.

(2) The server apparatus according to (1), in which the processor is configured to:
  manage the number of the batteries to be mounted on the registered vehicle in addition to the identification information; and
  unlock the lock device in accordance with the number of the batteries when it is determined to permit replacing the battery.

According to (2), the battery replacement can be smoothly performed.

(3) The server apparatus according to (1) or (2), in which when the registered vehicle is a vehicle of a user of a subscription service, the processor is configured to charge the usage fee when the travel distance or the battery usage amount exceeds a contract range.

According to (3), the user of the subscription service can freely replace the batteries within the contract range in which the travel distance or the battery usage amount is defined by a contract.

(4) The server apparatus according to any one of (1) to (3), in which the processor is configured to:
  store fee-related information at a time of previous battery replacement in association with the identification information; and
  calculate the usage fee by subtracting the fee-related information at the time of the previous battery replacement from fee-related information at a time of current battery replacement acquired from the vehicle key device.

According to (4), since it is sufficient that the identification information and the fee-related information at the time of the current battery replacement are stored in the vehicle key device, an increase in a size of the vehicle key device can be reduced.

(5) The server apparatus according to any one of (1) to (4), in which the processor is configured to:
  acquire information on both the travel distance and the battery usage amount; and
  calculate the usage fee based on both the travel distance and the battery usage amount which are acquired from the vehicle key device.

According to (5), by calculating the usage fee based on both the travel distance and the battery usage amount, the usage fee can be more appropriately calculated.

(6) The server apparatus according to (5), in which the processor is configured to:
  calculate an electric power consumption rate based on the travel distance and the battery usage amount; and
  determine an abnormality of the vehicle when the electric power consumption rate exceeds a first threshold.

According to (6), since the abnormality of the vehicle can be determined when the electric power consumption rate is low, a failure of the vehicle can be found at an early stage.

(7) The server apparatus according to (6), in which:
  the processor is configured to notify the vehicle or the vehicle key device when determining the abnormality of the vehicle.

According to (7), the user can recognize the vehicle abnormality.

(8) The server apparatus according to (6) or (7), in which:
  the first threshold is set based on information stored in a storage device.

According to (8), an appropriate threshold can be set in accordance with a type of the battery.

(9) The server apparatus according to (8), in which:
  the information stored in the storage device is based on a correlation between the travel distance of the registered vehicle and the battery usage amount of the registered vehicle of a user of a service.

According to (9), since the threshold is set in accordance with an actual use state, a detection accuracy of the vehicle abnormality can be improved.

(10) The server apparatus according to any one of (1) to (9), in which the processor is configured to:
  communicate with the vehicle and acquire a battery usage amount during stop of the vehicle; and
  add the usage fee when the battery usage amount during the stop of the vehicle exceeds a second threshold.

According to (10), since the battery usage amount during the stop of the vehicle is taken into consideration, the usage fee can be calculated more appropriately.

(11) The server apparatus according to any one of (1) to (10), in which the processor is configured to:
  communicate with the vehicle and acquire a battery usage amount during detachment of the batteries when the detachment of the batteries in the vehicle is detected; and
  add the usage fee when the battery usage amount during the detachment of the batteries exceeds a third threshold.

According to (11), even when the battery is detached from the vehicle and to be used for the other vehicle or the like, the actual battery usage amount is taken into consideration, and therefore the usage fee can be calculated more appropriately.

(12) The server apparatus according to any one of (1) to (11), in which the processor is configured to:
  communicate with the vehicle and guide the vehicle to the battery stand; and
  notify the vehicle or the user of the battery stand holding the batteries which are replaceable among a plurality of battery stands.

According to (12), since the user can know in advance the battery stand holding the replaceable batteries, convenience is improved.

(13) The server apparatus according to (12), in which:
  when the user designates the battery stand, the processor is configured to prohibit unlocking of the lock device of a battery to be replaced by another user.

According to (13), an event in which the battery is already borrowed at the battery stand designated by the user can be prevented.

(14) The server apparatus according to (13), in which:
  the processor is configured to unlock the lock device of the battery to be replaced by the vehicle key device of the user.

According to (14), the user can perform the battery replacement without a dedicated card or the mobile terminal device, thereby improving convenience.

(15) The server apparatus according to (5), in which:
  the processor is configured to determine an abnormality of a returned battery based on a charging amount of the returned battery at a time of charging the returned battery.

According to (15), deterioration, failure, and the like of the returned battery can be recognized in the battery stand, and therefore the abnormal battery can be prevented from being lent to the user.

(16) The server apparatus according to any one of (1) to (15), in which:
the vehicle key device includes an input unit (battery replacement operation unit 44); and
the server apparatus is configured to start communication with the vehicle key device based on a signal input to the input unit.

According to (16), by starting communication with the vehicle key device based on the signal input to the input unit of the vehicle key device, the lock device can be unlocked at a timing desired by the user.

The invention claimed is:

1. A server apparatus of a battery stand holding a plurality of batteries to be detachably attached to a vehicle movable using electric power, the server apparatus comprising:
a processor configured to:
manage identification information of a registered vehicle registered in advance;
acquire identification information on a vehicle of a user who wants to replace the batteries from a vehicle key device;
acquire fee-related information from the vehicle key device, the fee-related information being at least one of a travel distance and a battery usage amount of the vehicle of the user;
calculate a usage fee of the batteries based on the fee-related information;
determine permission and prohibition to replace a battery;
control a lock device which enables taking-out of the batteries accommodated in the battery stand;
determine the permission and prohibition to replace the batteries based on the identification information acquired from the vehicle key device and the identification information; and
unlock the lock device when it is determined to permit replacing the batteries.

2. The server apparatus according to claim 1, wherein the processor is configured to:
manage the number of the batteries to be mounted on the registered vehicle in addition to the identification information; and
unlock the lock device in accordance with the number of the batteries when it is determined to permit replacing the battery.

3. The server apparatus according to claim 1, wherein:
when the registered vehicle is a vehicle of a user of a subscription service, the processor is configured to charge the usage fee when the travel distance or the battery usage amount exceeds a contract range.

4. The server apparatus according to claim 1, wherein the processor is configured to:
store fee-related information at a time of previous battery replacement in association with the identification information; and
calculate the usage fee by subtracting the fee-related information at the time of the previous battery replacement from fee-related information at a time of current battery replacement acquired from the vehicle key device.

5. The server apparatus according to claim 1, wherein the processor is configured to:
acquire information on both the travel distance and the battery usage amount; and
calculate the usage fee based on both the travel distance and the battery usage amount which are acquired from the vehicle key device.

6. The server apparatus according to claim 5, wherein the processor is configured to:
calculate an electric power consumption rate based on the travel distance and the battery usage amount; and
determine an abnormality of the vehicle when the electric power consumption rate exceeds a first threshold.

7. The server apparatus according to claim 6, wherein:
the processor is configured to notify the vehicle or the vehicle key device when determining the abnormality of the vehicle.

8. The server apparatus according to claim 6, wherein:
the first threshold is set based on information stored in a storage device.

9. The server apparatus according to claim 8, wherein:
the information stored in the storage device is based on a correlation between the travel distance of the registered vehicle and the battery usage amount of the registered vehicle of a user of a service.

10. The server apparatus according to claim 1, wherein the processor is configured to:
communicate with the vehicle and acquire a battery usage amount during stop of the vehicle; and
add the usage fee when the battery usage amount during the stop of the vehicle exceeds a second threshold.

11. The server apparatus according to claim 1, wherein the processor is configured to:
communicate with the vehicle and acquire a battery usage amount during detachment of the batteries when the detachment of the batteries in the vehicle is detected; and
add the usage fee when the battery usage amount during the detachment of the batteries exceeds a third threshold.

12. The server apparatus according to claim 1, wherein the processor is configured to:
communicate with the vehicle and guide the vehicle to the battery stand; and
notify the vehicle or the user of the battery stand holding the batteries which are replaceable among a plurality of battery stands.

13. The server apparatus according to claim 12, wherein:
when the user designates the battery stand, the processor is configured to prohibit unlocking of the lock device of a battery to be replaced by another user.

14. The server apparatus according to claim 13, wherein:
the processor is configured to unlock the lock device of the battery to be replaced by the vehicle key device of the user.

15. The server apparatus according to claim 5, wherein:
the processor is configured to determine an abnormality of a returned battery based on a charging amount of the returned battery at a time of charging the returned battery.

16. The server apparatus according to claim 1, wherein:
the vehicle key device includes an input unit; and
the server apparatus is configured to start communication with the vehicle key device based on a signal input to the input unit.

* * * * *